Patented Oct. 24, 1933

1,931,844

UNITED STATES PATENT OFFICE

1,931,844

SOLUBLE CELLULOSE ESTERS OF THE HIGHER FATTY ACIDS

Max Hagedorn and Georg Hingst, Dessau in Anhalt, Germany, assignors to I. G. Farbenindustrie Aktiengesellschaft, Frankfort-on-the-Main, Germany, a corporation of Germany No Drawing. Application January 23, 1928
Serial No. 248,962, and in Germany January 27, 1927

5 Claims. (Cl 260—102)

The invention relates to a process of increasing the solubility of cellulose esters of higher fatty acids and to new products obtained by this process.

Cellulose esters of the higher fatty acids which may be obtained by interaction of a cellulose material, such as cellulose or hydrocellulose, and an acid chloride in the presence of an organic base, such as pyridine or quinoline, at a temperature below 100° C. are insoluble in the usual solvents or are sparingly soluble in aromatic hydrocarbons and in chlorinated aliphatic or aromatic hydrocarbons to form strongly viscous solutions which are generally gelatinous and in consequence are not applicable for many purposes.

By the present invention the solubility of such cellulose esters may be increased, so that from them solutions of any desired concentration may be obtained, which flow well and are of high technical value.

For this purpose the cellulose esters of higher fatty acids having an insufficient solubility are heated at a temperature below 200° C. in a liquid medium in the presence of an acid agent comprising inorganic and organic acids, their anhydrides, and chlorides, inorganic and organic salts of a strong acid with a weak base and mixtures of such compounds, the treating liquid always possessing an acid reaction. Among other substances the following are suitable: sulfuric acid, phosphorus oxychloride, benzene sulfonic acid, trichlor acetic acid, lauric anhydride, lauryl chloride, aluminium chloride, zinc chloride, ferric chloride, pyridine hydrochloride.

As a liquid medium for the reaction, when an insoluble ester is under treatment, among others there may be used with advantage liquids which tend to dissolve the ester after it has been changed. In the case of sparingly soluble esters there may be used as a liquid medium a solvent for the ester or a liquid in which the ester does not dissolve and can only be suspended. In some cases the acid agent itself may serve as the liquid medium.

Even with low temperatures and with small proportions of acid agents the treatment modifies the solubility of the ester. By increasing the concentration of the acid agent the change is greatly accelerated. The temperature has an especially great influence. In the case of some acid agents a certain temperature limit must be exceeded in order that an appreciable variation in the properties of the ester may be procured. For example, when treating the insoluble cellulose tristearate with trichloracetic acid or with pyridine hydrochloride a temperature of at least 140° C. is necessary.

The treatment of the ester is interrupted as soon as the desired solubility has been attained. In order to interrupt the reaction and isolate the product, the mixture may be poured into methyl alcohol, ethyl alcohol or acetone, whereby the ester is precipitated in the form of amorphous white flocks.

If the temperature, as indicated, is maintained below 200° C. a partial saponification of the ester, a known method of modifying the solubility of cellulose esters of the lower fatty acids, and also a further esterification or a change of acid radicles are avoided.

The cellulose esters of the higher fatty acids, treated in the above mentioned manner yield clear and bright solutions of low viscosity in the usual solvents and may be worked up into films and skins of surprising softness and extensibility, so that they are of remarkable technical value.

By the invention there may be made among others soluble cellulose mono-esters of higher fatty acids which hitherto have been obtained only in an insoluble form.

The following examples without limiting the invention illustrates how it may be executed:

*Example 1.*—100 grams of insoluble cellulose tri-stearate are thoroughly moistened with 500 cc. of tetrachlormethane and after addition of 5 grams of trichloracetic acid the mixture is heated to 145° C. After about 1½ hours there is produced a clear, transparent solution in which no fibers can be detected. The mixture is poured into ethyl alcohol and the ester, thus precipitated in the form of white amorphous flocks, is filtered, washed and dried. The ester thus produced is soluble in benzene, chloroform, tetrachlorethane, amyl acetate and in a mixture of 2 parts of toluene and 1 part of ethyl acetate.

*Example 2.*—100 grams of insoluble cellulose trilaurate are thoroughly moistened with 500 cc. of tetrachlorethane and 10 grams of pyridine hydrochloride are added; the mixture is then heated to 145° C. After about 1 hour the previously insoluble ester has become completely dissolved. The product is isolated by precipitation by means of ethyl alcohol and then has the solubility of the ester obtained as described in Example 1.

*Example 3.*—100 grams of insoluble cellulose tri-stearate are moistened with 500 cc. of toluene and, after addition of 2 grams of ferric chloride, the mixture is heated on the steam bath to 90–100° C. After 10–15 minutes the ester has become completely dissolved and may be isolated as described in the preceeding examples. It has the same solubility as the ester made as described in Example 1.

*Example 4.*—A sparingly soluble cellulose ester of a higher fatty acid, for instance cellulose di-palmitate, is mixed with benzene or with another solvent to form a solution of 20% strength and with 0.1–2 per cent., calculated on the weight of the solvent, of one of the acid agents mentioned above. The mixture is heated at 80–145° C. until the ester shows the desired solubility. The reaction is then interrupted by pouring the mixture into ethyl alcohol. The ester is precipitated in the form of white amorphous flocks, which are filtered, washed and dried. Its solutions in chloroform, dichloromethane, benzene or the like differ from those of the parent material in that their viscosity is small and the gelatinous character has disappeared.

*Example 5.*—100 grams of sparingly soluble cellulose tri-laurate are dissolved in 200 grams of lauric anhydride at 190° C. After it has been cooled, the mixture is poured into ethyl alcohol whereby the ester is separated in the form of a viscous liquid. This product is boiled several times with ethyl alcohol, while stirring well, then filtered and dried. The softening point of the ester treated in this manner is about 70° C. The solutions of the product have extraordinarily little viscosity so that easily flowing solutions may be obtained in concentrations up to 70 per cent.

*Example 6.*—150 grams of insoluble cellulose di-stearate are moistened with 1000 cc. of xylene and, after addition of 10 cc. of phosphorus oxychloride, the mixture is treated at 100° C. After 1–1½ hours a clear solution is formed, from which the reaction product is precipitated by ethyl alcohol. It is filtered and dried. The ester so obtained dissolves in halogenated aliphatic hydrocarbons and in aromatic hydrocarbons.

*Example 7.*—150 grams of cellulose di-laurate are moistened with 1000 cc. of xylene and, after addition of 40 grams lauryl chloride, the mixture is heated at 135–140° C. After 2½–3 hours the ester is completely dissolved. The reaction product may be isolated as indicated in the foregoing example. It dissolves in halogenated aliphatic hydrocarbons and in aromatic hydrocarbons.

What we claim is:

1. A process for increasing the solubility of cellulose esters of lauric acid which comprises heating said cellulose esters at a temperature below 200° C. in a liquid medium which possesses an acid reaction.

2. A process for increasing the solubility of cellulose esters of lauric acid which comprises heating said cellulose esters at a temperature below 200° C. in a liquid medium which possesses an acid reaction due to the presence of a compound of the group consisting of acid anhydrides and acid chlorides.

3. A process for increasing the solubility of cellulose esters of lauric acid which comprises heating said cellulose esters at a temperature below 200° C. in a liquid medium which possesses an acid reaction due to the presence of an acid chloride.

4. A process for increasing the solubility of cellulose esters of lauric acid which comprises heating said cellulose esters at a temperature below 200° C. in a liquid medium which possesses an acid reaction due to the presence of pyridine hydrochloride.

5. A cellulose mono-ester of a higher fatty acid, said ester being soluble in organic solvents.

MAX HAGEDORN.
GEORG HINGST.